(12) United States Patent
Johnes

(10) Patent No.: US 7,258,077 B2
(45) Date of Patent: Aug. 21, 2007

(54) LITTER BOX LINER

(75) Inventor: Marty Johnes, Alton, IL (US)

(73) Assignee: Alfa-Pet, Inc., St. Louis, MO (US)

( * ) Notice: Subject to any disclaimer, the term of this patent is extended or adjusted under 35 U.S.C. 154(b) by 77 days.

(21) Appl. No.: 11/160,317

(22) Filed: Jun. 17, 2005

(65) Prior Publication Data

US 2006/0283398 A1    Dec. 21, 2006

(51) Int. Cl.
*A01K 29/00*    (2006.01)

(52) U.S. Cl. ..................................... 119/170

(58) Field of Classification Search ......... 119/165–170
See application file for complete search history.

(56) References Cited

U.S. PATENT DOCUMENTS

| | | | |
|---|---|---|---|
| 4,509,570 A | 4/1985 | Eby et al. | |
| 4,646,985 A * | 3/1987 | Goyau et al. | 242/386 |
| 4,747,701 A | 5/1988 | Perkins | |
| 4,787,083 A * | 11/1988 | Tanaka | 370/431 |
| 4,788,935 A * | 12/1988 | Bella et al. | 119/168 |
| 4,813,374 A * | 3/1989 | Sides | 119/170 |
| 4,836,141 A * | 6/1989 | Whitfield | 119/169 |
| 4,840,140 A * | 6/1989 | Yananton et al. | 119/169 |
| 4,869,204 A | 9/1989 | Yananton | |
| 5,115,766 A * | 5/1992 | Williams | 119/168 |
| 5,232,118 A | 8/1993 | Samuel | |
| 5,404,999 A | 4/1995 | Bednar | |
| 5,482,007 A | 1/1996 | Kumlin | |
| 5,918,567 A * | 7/1999 | Roth | 119/170 |
| 6,223,688 B1 * | 5/2001 | Engel | 119/170 |
| 6,585,415 B2 | 7/2003 | Malaspina | |
| 2004/0086205 A1 | 5/2004 | Raterman | |

* cited by examiner

*Primary Examiner*—Thomas Price
(74) *Attorney, Agent, or Firm*—Blackwell Sanders

(57) ABSTRACT

A litter box liner is provided. The litter box liner includes a bag with an open mouth portion and a resiliently deformable member is attached to the bag adjacent the open mouth with the resiliently deformable member circumscribing at least the majority of the fully extended perimeter length of the open mouth.

21 Claims, 2 Drawing Sheets

LITTER BOX LINER

BACKGROUND OF THE INVENTION

Liners have been used in litter boxes for many years. They often take the form of a bag having an open mouth. When installed on the litter box, one panel of the bag is placed in the litter box cavity and is flexible enough to conform generally to the shape of the cavity. Litter such as cat litter can then be placed in the cavity with the liner generally preventing contact with the litter box. In order to provide a universal fit, such liners tend to be oversized so that they can accommodate both large and small litter boxes. This can lead to problems. If there is sufficient excess material in the liner, the liner can move or shift during use of the litter box by an animal, such as a cat, which can lead to litter going into the litter box itself. Such movement may result in having to clean the litter box as well as install a new litter box liner or reposition the currently installed liner.

Different size bags could be an option, however, at retail outlets, it is sometimes difficult to obtain shelf space for a series of similar items. Since shelf space is often times required to be purchased by the supplier. Further, consumers are often resistant to paying a premium price for an apparent commodity type product even though there are improvements in functionality. Thus, it is desirable to have no appreciable increase in the cost or the price of the liners even when there is an improvement provided. Further, means to assist in the securing of the liner needs to not only be simple, and inexpensive, but should to also be adapted for use with multiple sizes of litter boxes.

Thus, there is a need for an improved litter box liner that will retain its position in the litter box during use and that can be used on multiple sizes of litter boxes.

SUMMARY OF INVENTION

The present invention involves the provision of a litter box liner comprising a bag with a resiliently deformable member attached adjacent to the open mouth with the resiliently deformable member circumscribing at least the majority of the perimeter of the mouth opening. The liner is adapted for use with various sizes of litter boxes and mounting orientations.

The present invention also involves the provision of a method of making a litter box liner involving the attachment of a resiliently deformable member to a bag adjacent the open mouth of a bag with the resiliently deformable member circumscribing at least a majority of the perimeter of the mouth opening. The resiliently deformable member is attached to the bag by stitching.

DETAILED DESCRIPTION

Figure 1:
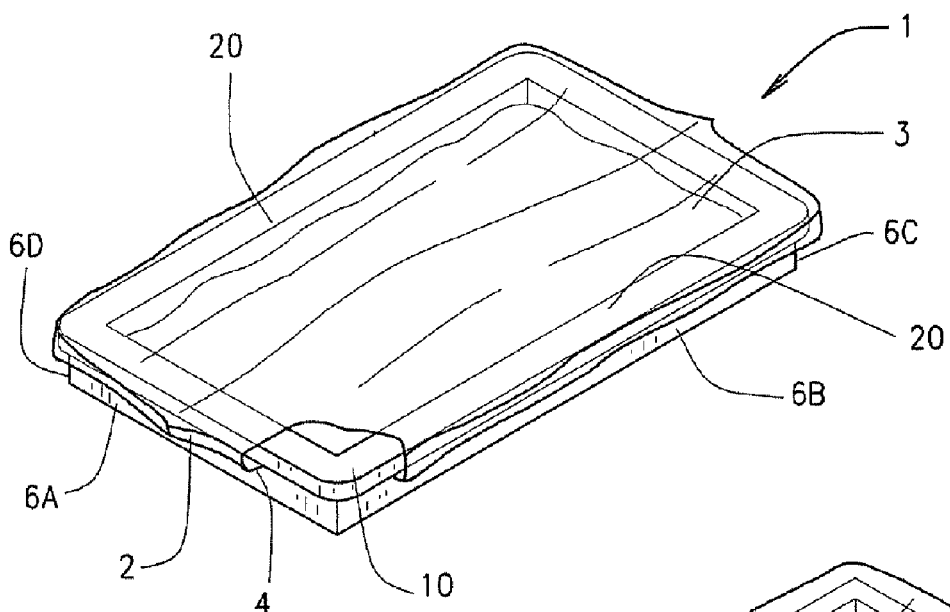
FIG. 1 is a perspective view of a litter box liner installed on a litter box with the mouth of the bag being coextensive with the mouth of the litter box.

The reference numeral 1 designates generally a liner for a litter box 2. The litter box 2 can be of any suitable type, having an upwardly opening mouth 3 a bottom wall 4 and a plurality of preferably interconnected sidewalls 6 A-D defining a cavity 8. Litter boxes are well known in the art and need not be described herein detail. Generally, the littler box will be on the order of 12 inches to1 4 inches wide and 14 inches to 20 inches long and have a depth for the cavity 8 of 2 inches to 8 inches. A peripheral lip 10 can be provided adjacent the open mouth 3 of the cavity 8, to facilitate lifting and to provide some rigidity for the open mouth 3 of the cavity 8.

The liner 1 includes a bag 11 and an attached resiliently deformable member 12. The liner, includes at least one panel or wall 20 and preferably two panels 20. The liner 1 includes the bag 11 with an open mouth 22 having a free edge 24. The bag 11 may be formed from a sheet by having a folded edge 26 which forms the bottom edge of the liner 1 and two edges 27 that are seamed and positioned on opposite sides of the liner. The edges 27 may be seamed by heat sealing or the like as is well known in the art of making the bags. Alternately, the side edges 27 may be formed during the bag forming process and the bag completed by sealing the bottom edge 26. Additionally, the bag 11 may be formed without heat sealing any of the edges. The bag 11 is preferably made of a flexible polymeric material such as polyethylene, polyester or the like that litter will not pass through, i.e., litter impermeable, and can have a thickness on the order of 0.001 to 0.010 inches and preferably has a thickness on the order of 0.002 to about 0.005 inches. The thickness and hence flexibility is an important factor to help the bag 11 conform generally to the inside shape of the litter box 2 and for cost.

Figure 4:
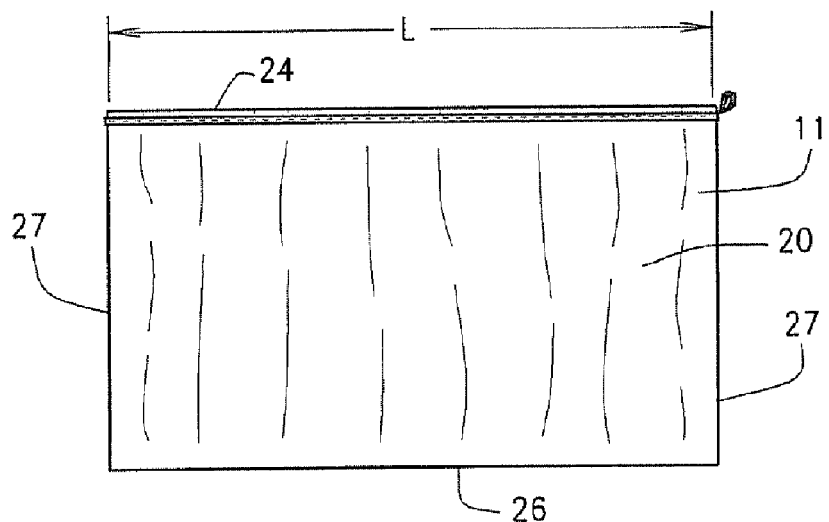
FIG. 4 is a view similar to FIG. 3 but with the resiliently deformable member shown in stretched or extended condition.
Figure 5:
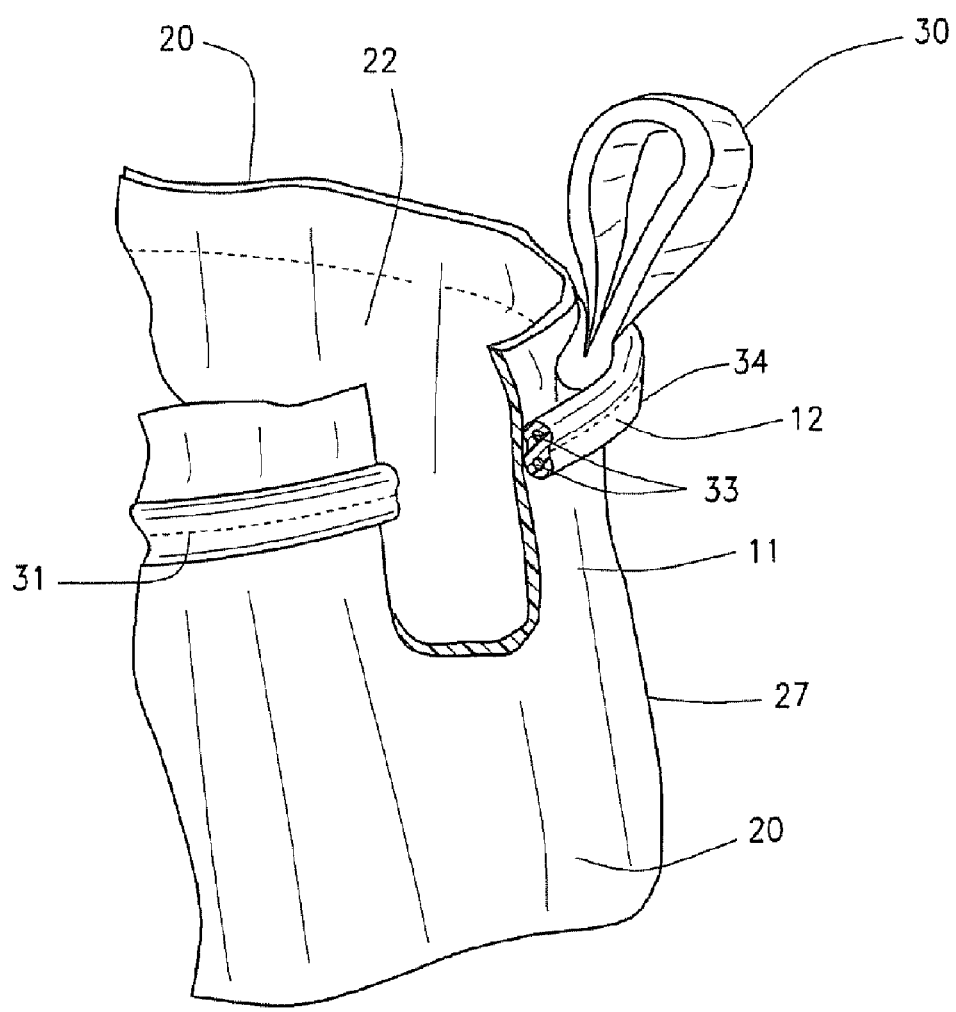
FIG. 5 is an enlarged fragmentary view of a portion of the liner showing details of the attachment of the resiliently deformable member to the bag.

The resiliently deformable member 12 is attached to the bag 11 adjacent the open mouth 22 and circumscribes at least the majority of the length of the fully extended perimeter (2L) of the open mouth 22. Preferably the resiliently deformable member 12 circumscribes at least about 75% of the fully extended perimeter length of the open mouth 22 and more preferable circumscribes substantially all or all of the fully extended perimeter length of the open mouth. The resiliently deformable member 12 may be elastic such as used in clothing for waist bands and the like, and preferably has a stretch factor F of at least about 60 grams and preferably at least about 90 grams. Preferably, F is less than about 300 grams in tension. Stretch factor as used herein is the force needed to extend the length of the member 12 from a relaxed condition to an extended length 50% greater than the relaxed length and in a free state not attached to the bag 11. As a standard, a 4 inch sample length is stretched to 6 inches. The resiliently deformable member 12 should have sufficient stretch to permit full expansion of the mouth of the bag as limited by the perimeter length (2L) of the open mouth 22 which, as seen in FIG. 4 would be 2L. When the open mouth 22 is contracted, its contracted perimeter length should be preferably in the range between about 25% and about 75% of the perimeter length (2L) of the fully extended open mouth 22. The extended length of the mouth 22 of the liner 1 should be at least sufficient for installing the liner 1 on a litter box 2 and preferably, the extended length is the full perimeter length (2L) of the open mouth.

The resiliently deformable member 12 is preferably continuous i.e., one piece. It is attached to the bag to form the liner with the attachment being in a manner to permit both extension and contraction of the resiliently deformable member 12 and the bag 11. In a particularly preferred embodiment, the resiliently deformable member 12 is attached to the bag 11 by stitching or sewing as at 31. A plain straight stitch has been found suitable. Stitch length is preferably on the order of 1/16 of an inch to 3/16 of an inch and preferably about 1/8 inches long. The resiliently deformable member 12 is preferably an elastic member, i.e., a member with one or more elastomeric elements 33 and a fabric covering 34 to provide stitchability without harm to the elastomeric element portion. It has been found that a ribbon of elastic on the order of 0.09 inches to about 0.25 inches wide and 0.030 inches to 0.060 inches thick. The stitching attachment can be via a thread which can be a monofilament thread or a monofilament thread with multifilament thread being preferred. Preferably the member 12 is an elastic member such as that used in sewing hems, waists, cuffs, necklines and the like and is often referred to as braided elastic or knit elastic, depending on the cover 34. Such elastic members usually include two or more elastomeric members held in side by side relationship by a braided or knit cover. Such a construction permits sewing through a cover portion 34 between the elastomeric members 33 since a sewing needle puncture of an elastomeric member would adversely affect its integrity and strength when stretched. A preferred member 12 is generally rectangular in cross section and has a pair of laterally spaced apart elastomeric members 33 inside the cover 34 with the cover securing the elastomeric members in spaced relationship. The ends of the resiliently deformable member 12 may be sewn together for example with a loop 30 being formed preferably at the end of the member 12, to facilitate removal of the liner 1 from the litter box. It is preferred that the resiliently deformable member 12 be attached to the bag 11 adjacent the free edge 24 and preferably within about 1 inch or less of the free edge 24 of the open mouth 22.

Figure 2:
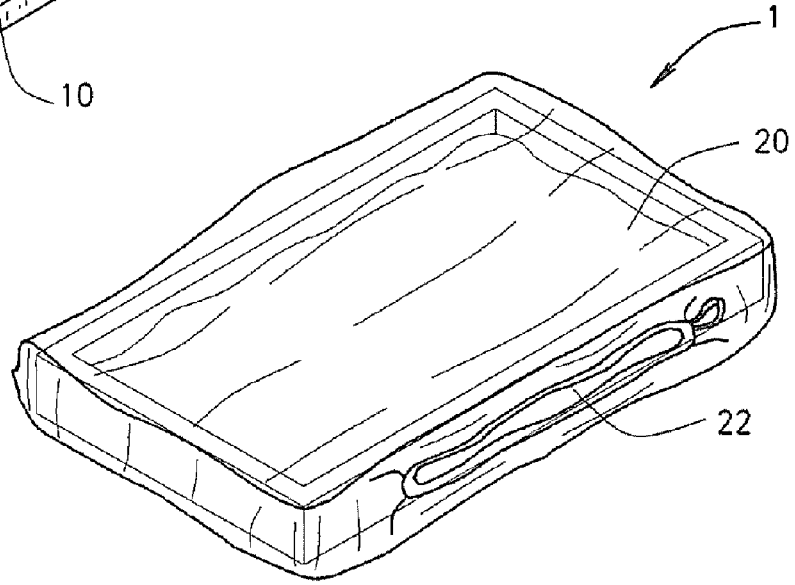
FIG. 2 is a perspective view similar to FIG. 1 showing the litter box liner mounted on a litter box with the mouth of the liner being coextensive with a side of the litter box.
Figure 3:
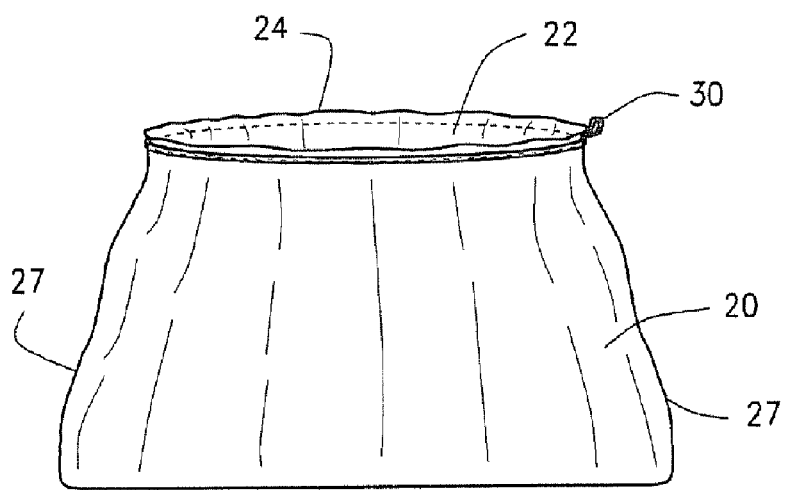
FIG. 3 is a side elevation view of the liner wherein the resiliently deformable member is in a relaxed condition.

By proper sizing of the bag 11, the open mouth 22 and resiliently deformable member 12, the liner 1 may be easily installed on various sizes of litter boxes 2. For example, as seen in FIG. 1 the liner 1 may be mounted to the litter box 2 by stretching the mouth 22 to an extended condition and having the resiliently deformable member 12 extend down over the top edge of the outside of the litter box with an outside portion of the bag covering the inside of the walls 6 A-D and bottom 4 of the littler box 2 and the inside being exposed. The tension in the stretched or extended resiliently deformable member 12 releasably retains the liner 1 mounted to the litter box 2. Preferably, the litter box 2 has a lip 10 projecting outwardly from the walls 6 A-D and the resiliently deformable member 11 can be positioned under or below the lip 10 to also help releasably retain the liner 1 mounted on the litter box 2. To remove the liner 1, the resiliently deformable member 12 is slightly extended to a length allowing the open mouth 22 of the liner 1 to be moved upwardly and off the side walls 6 A-D allowing the liner to be removed, with or without litter therein, from the litter box 2. As seen in FIG. 2, the liner 1 may have the entirety of the litter box 2 installed in the inside or interior of the liner wherein one of the walls 6 A-D is coextensive with the open mouth 22 of the liner 1. The tension in the resiliently deformable member 12 will releasably retain the liner 1 mounted to the litter box 2 and resist excessive movement, draping or sagging of the liner 1 into the cavity 3 of the litter box 2.

In the formation of the liner 1, a bag 11 is suitable formed. This can be accomplished by folding a sheet of material over and sealing adjacent edges to form the side edges 27 of the liner 1. Alternatively, a tube may be formed and cut the length and the bag 11 completed by sealing the adjacent bottom edges together to form the bottom 2 of the bag 11. The panels 20 forming the bag may be integrally formed where there are no seams. In the case of a sewn form of attachment of the resiliently deformable member 11, the formed bag 11 is then taken to a sewing machine and the resiliently deformable member 11 is stretched or extended in length after being cut to a suitable length. The extended or stretched resiliently deformable member 11 is then sewn to the bag 11 with thread by needle stitching. The member 11 may be cut from a supply thereof after attachment to the bag 11. Such a construction allows uniform puckering and uniform distribution of material about the open mouth 22 of the bag 11 facilitating installation of the litter box 1 at least partially into the liner 1. After the stitching is completed, the mouth 22 of bag 11 is allowed to relax along with the resiliently deformable member 11. The loop 30 may be formed from the member 11 at the time of stitching. The completed liner 1 may then be packaged for distribution and sale.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A litter box liner including:
   a bag having at least one sidewall and an open mouth portion said bag being made at least partially of a litter impermeable material; and
   a resiliently deformable member attached to the bag adjacent the mouth portion and circumscribing at least a majority of a perimeter of the mouth portion, said member having an extension factor of at least about 60 grams and having an extended length sufficient to permit removable mounting of the bag to a litter box and a contracted length when attached to the bag such that the bag mouth has a contracted length of less than about 75% of a fully extended perimeter length of the mouth portion.

2. A litter box liner as set forth in claim 1 wherein the member is attached to the bag at least partially with a sewn thread.

3. A litter box liner as set forth in claim 2 wherein the thread includes a monofilament thread.

4. A litter box liner as set forth in claim 3 wherein the member is in the form of an elastic ribbon.

5. A litter box liner as set forth in claim 4 wherein the member is a single continuous member.

6. A litter box liner as set forth in claim 5 wherein the member circumscribes at least about 75% of the perimeter of the mouth.

7. A litter box liner as set forth in claim 6 wherein the member circumscribes at least substantially all of the perimeter of the mouth.

8. A litter box liner as set forth in claim 1 wherein the bag is made at least partially of a polymeric film.

9. A litter box liner as set forth in claim 8 wherein the polymeric film has thickness in the range of between about 0.001 inches and about 0.010 inches.

10. A litter box liner as set forth in claim 9 wherein the polymeric film has thickness in the range of between about 0.002 inches and about 0.005 inches.

11. A litter box liner as set forth in claim 9 wherein the member is attached to the bag at least partially by stitching through the member and sidewall.

12. A litter box liner as set forth in claim 11 wherein the bag is at least partially made of polymeric film and said member including an elastic ribbon.

13. A litter box liner as set forth in claim 12 wherein the bag has a bottom fold line and at least one side seam extending from the fold line to a free end edge of the open mouth portion.

14. A litter box liner including:
    a bag having at least one wall and an open mouth portion being made at least partially of a litter impermeable material;
    a resiliently deformable member attached to the bag adjacent the mouth portion and circumscribing at least a majority of an extended length of a perimeter of the mouth portion, said member, when in a contracted condition reducing the fully extended perimeter length of mouth portion, said member extending along at least about a majority of the fully extended perimeter length of the mouth portion.

15. A litter box liner as set forth in claim 14 wherein the member circumscribes at least about 75% of the fully extended perimeter length of the mouth portion.

16. A litter box liner as set forth in claim 15 wherein the member circumscribes at least substantially all of the fully extended perimeter length of the mouth portion.

17. A litter box liner as set forth in claim 14 wherein the member is continuous.

18. A litter box liner as set forth in claim 17 wherein the member includes an elastic member having a fabric covering.

19. A litter box lines as set forth in claim 18 wherein the member is attached to the bag by sewn stitches of thread.

20. A litter box liner as set forth in claim 19 wherein the thread passes through the covering.

21. A litter box liner as set forth in claim 20 wherein the elastic member includes a plurality of elastomeric members inside the covering.

* * * * *